US012577789B2

(12) United States Patent
Boucké

(10) Patent No.: US 12,577,789 B2
(45) Date of Patent: Mar. 17, 2026

(54) TILE PANEL, SURFACE COVERING OF A MULTITUDE OF SUCH TILE PANELS FOR A FLOOR, CEILING OR WALL SURFACE

(71) Applicant: I4F Licensing NV, Turnhout (BE)

(72) Inventor: Eddy Alberic Boucké, Menen (BE)

(73) Assignee: i4F Licensing NV, Turnhout (BE)

( * ) Notice: Subject to any disclaimer, the term of this patent is extended or adjusted under 35 U.S.C. 154(b) by 113 days.

(21) Appl. No.: 17/917,144

(22) PCT Filed: Apr. 6, 2021

(86) PCT No.: PCT/EP2021/058956
§ 371 (c)(1),
(2) Date: Oct. 5, 2022

(87) PCT Pub. No.: WO2021/204810
PCT Pub. Date: Oct. 14, 2021

(65) Prior Publication Data
US 2023/0160216 A1 May 25, 2023

(30) Foreign Application Priority Data
Apr. 6, 2020 (NL) ...................................... 2025283

(51) Int. Cl.
*E04F 15/02* (2006.01)
*B32B 3/06* (2006.01)
*E04F 13/08* (2006.01)
*E04F 15/10* (2006.01)

(52) U.S. Cl.
CPC ...... *E04F 15/02033* (2013.01); *E04F 15/105* (2013.01); *B32B 3/06* (2013.01); *E04F 13/0894* (2013.01); *E04F 15/02* (2013.01); *E04F 15/02038* (2013.01); *E04F 15/02161*

(2013.01); *E04F 15/107* (2013.01); *E04F 2201/0153* (2013.01); *E04F 2201/043* (2013.01)

(58) Field of Classification Search
CPC .............. E04F 15/02033; E04F 15/105; E04F 2201/0153; E04F 15/02038; E04F 15/02; E04F 15/107; E04F 13/0894; E04F 15/02161; E04F 2201/043; B32B 3/06
See application file for complete search history.

(56) References Cited

U.S. PATENT DOCUMENTS

| | | | | |
|---|---|---|---|---|
| 5,755,068 A * | 5/1998 | Ormiston | .......... | E04F 15/02033 |
| | | | | 428/167 |
| 2006/0099386 A1* | 5/2006 | Smith | ............... | E04F 15/02033 |
| | | | | 428/192 |
| 2006/0156672 A1* | 7/2006 | Laurent | .................... | B44C 3/08 |
| | | | | 52/589.1 |

(Continued)

FOREIGN PATENT DOCUMENTS

| | | | | | |
|---|---|---|---|---|---|
| CN | 108979058 A | * | 12/2018 | ........ | E04F 15/02005 |
| DE | 10232508 C1 | | 12/2003 | | |

(Continued)

*Primary Examiner* — Omar F Hijaz
(74) *Attorney, Agent, or Firm* — The Webb Law Firm

(57) ABSTRACT

The present invention relates to a decorative tile panel for covering a floor, ceiling, or wall. Furthermore, the invention relates to a surface covering for a floor, ceiling or wall surface which is constructed by a multitude of neighbouring tile panels according to the invention, wherein the plurality of tile panels are preferably interconnected.

19 Claims, 4 Drawing Sheets

(56)         References Cited

U.S. PATENT DOCUMENTS

2007/0175144  A1*   8/2007   Hakansson  ........... B44C 5/0492
                                                           52/403.1
2012/0279158  A1    11/2012  Konstanczak
2016/0046144  A1     2/2016  Thiers
2018/0298621  A1    10/2018  Courey et al.
2021/0285232  A1*    9/2021  Fahle  ..................... B44B 5/026

FOREIGN PATENT DOCUMENTS

EP          1971735  B1     1/2013
JP         201048004  A     3/2010
JP        2012233400  A    11/2012
WO        2011138152  A1   11/2011
WO        2020025129  A1    2/2020

* cited by examiner

TILE PANEL, SURFACE COVERING OF A MULTITUDE OF SUCH TILE PANELS FOR A FLOOR, CEILING OR WALL SURFACE

CROSS-REFERENCE TO RELATED APPLICATIONS

This application is the United States national phase of International Application No. PCT/EP2021/058956 filed Apr. 6, 2021, and claims priority to European Patent Application No. 2025283 filed Apr. 6, 2020, the disclosures of which are hereby incorporated by reference in their entirety.

BACKGROUND OF THE INVENTION

Field of the Invention

The present invention relates to a decorative tile panel. Furthermore, the invention relates to a surface covering for a floor, ceiling or wall surface which is constructed by a multitude of neighbouring tile panels according to the invention.

Description of Related Art

It has been common for centuries, to apply a surface covering of neighbouring tiles in a traditional way by applying a cement layer onto the surface, and subsequently position and fix the tiles onto the cement layer in a surface covering pattern. In this traditional method, grout is furthermore applied between adjacent side edges of neighbouring tile panels to fill up an interspatial gap between adjacent side edge, which filled gaps are commonly referred to as 'grout lines'. These grout lines are visible as slightly recessed joint lines of grout which are present between adjacent top surfaces of neighbouring tiles.

As an alternative to the traditional way of applying a tile covering, it has been proposed in the art to develop a tile panel which has a top surface made from a synthetic material having similar properties as a traditional tile material such as ceramic material. When such tile panels are positioned adjacent to each other and adhered onto a surface, a covering of neighbouring tiles can be achieved in a different, and practical way in which no cement or grout is necessary. Typically, the adjacent side edges of these neighbouring tile panels are laid in abutting contact with each other, and may include interconnecting coupling profiles. In this way, one can dispense with the application of grout in the form of grout lines.

However, in order to mimic an overall appearance of a traditional tile covering, it has recently been proposed to provide the side edges of a tile panel with an imitation grout line by milling a rectangular groove in the top surface of the tile panel which recess extends along a side edge of the tile panel.

A drawback of the imitation grout line known from the above prior art, is that the visual appearance of the imitation grout line is compromised in certain respects. First, the recess has an upwardly facing groove surface composed of flat surfaces that are in an angled configuration to each other which lead to a recess which provides the imitation grout line an artificial look and feel in comparison to a traditionally formed grout line. Second, at the interface of coupled adjacent side edges of neighbouring tile panels a seam is visible which splits the imitation grout line into two halves, and as such impedes the overall appearance of the imitation grout line which ideally should look like one uninterrupted body of grout that fills the gap between two neighbouring panels.

SUMMARY OF THE INVENTION

It is an objective of the present invention to reduce or eliminate the drawbacks known from the prior art, by developing a new tile panel having improved properties, in particular in view of the imitation grout line.

In a first aspect of the invention, the above objective is achieved by the provision of a decorative tile panel suitable for covering a floor, ceiling or wall surface, which tile panel comprises:

at least one core layer, and at least one decorative top section, directly or indirectly affixed to said core layer or integrated with said core layer, wherein the top section defines a top surface of the tile panel, a plurality of side edges at least partially defined by said core layer and/or by side top section, wherein the tile panel is provided with at least one imitation grout line along at least one side edge of the tile panel, which is formed by a channel-shaped recess connecting to the top surface of the tile panel, which recess extends along a side edge of the tile panel, wherein the recess has an upwardly facing recess surface, wherein said recess surface is at least partially concavely curved across the width direction of the recess. The upwardly facing recess surface is preferably at least partially formed by a separate grout covering layer.

As such, the tile panel contains an imitation grout line having an at least partially and preferably substantially completely rounded (curved) recess surface which resembles more accurately a surface that is inherent to a traditionally formed grout line.

It is noted in this context that the top section defines a highest top surface of the tile panel, which may either be flat or textured (e.g. embossed, preferably embossed in register with a decorative layer making part of said top section). This top surface, defined by the top section, is connected to the at least one recess, wherein said top surface and the upwardly facing recess surface together form the total top surface of the tile panel. Even in case the top surface of the top section is provided with a texture, such as an embossing with indentations, the maximum depth of the recess is typically larger than the maximum depth of said indentations.

The recess is for instance formed by designing, milling, cutting, printing, preferably digital printing, or any abrasive technique that is suitable for the purpose. Typically the recess is created by cutting away, so removing, material during the production process. However, it is imaginable that the recessed is created by design during the production process without having to remove material.

Preferably, at least one recess has a deepest point at a distance from the respective side edge, wherein said deepest point is located closer to said side edge than to the top surface of the tile panel, and wherein the width of said recess is at least two times, preferably at least three times the maximum depth of said recess with respect to the top surface of the tile panel. The deepest point may be a single deepest point, as seen in a cross-sectional view of the recess. The deepest point may also be a deepest zone, typically defined by a lowest horizontal section of the recess surface, as seen in a cross-sectional view of the recess. It is imaginable that the recess is provided with multiple, mutually distanced deepest points, as seen in a cross-sectional view. Preferably, the width of said recess is at least three times, preferably at least five times, more preferably at least six times the maximum depth of said recess with respect to the top surface of the tile panel. This leads to an—as seen in width direction-elongated, shallow recess, which is typically attractive for the cleanability of the recess, while lead to a relatively large visible recess surface, which is attractive from aesthetical point of view. Positioning the deepest point at a distance from the side edge has the advantage that moisture will be forced in a direction away from the side edge, and hence away from a seam formed in between two tile panels, which impedes moisture to seep into said seam which could stimulate microbial growth in between the tile panels. Hence, situating the deepest point at a distance from the side edge is preferred from a hygienical point of view. Moreover, this orientation of the deepest point is typically also preferred from an aesthetical point of view.

Preferably, the deepest point of said recess divides the recess into an inner recess portion, connecting to the top surface of the tile panel, and an outer recess portion, connecting to the side edge of the tile panel, wherein the width of the inner recess portion is at least two times, preferably at least three times, the width of the outer recess portion. This results in the embodiment, wherein the deepest point is located closer to the side edge than to the top surface of the tile panel, which allows a less steep (more gradual) transition from the top surface to the deepest point. Preferably, the maximum height of the inner recess portion with respect to the deepest point is at least four times the maximum height of the outer recess portion with respect to the deepest point. This leads to the embodiment, wherein the height of the outer recess portion is kept limited, which makes this outer recess portion less vulnerable for breakage.

Preferably, at least one concavely shaped part of the recess surface has an increasing radius towards the side edge. Preferably, the recess surface of the inner recess portion has an increasing radius towards the deepest point. This allows the formation of a clear transition line between the recess and the top surface of the tile panel, while keeping the depth of the recess as such limited. The thickness of the tile panel is preferably at least ten times the maximum depth of the recess with respect to the top surface of the tile panel.

The separate grout covering layer, if applied, does not make integral part of the core layer or the top section and is applied as separate layer, typically during or after the production process. The separate grout layer is used to provide the imitation grout line of suitable appearance, such as a grey appearance to imitate mortar and/or a darker appearance that than the top section in order to create a visual depth effect. Moreover, the separate grout layer typically has a protective function in order to protect the vulnerable underlying side edge part of the tile panel. Here, the separate grout layer may e.g. have a greater scratch resistance (abrasion resistance) than the underlying layer and/or may have better waterproof properties than the underlying side edge part. The separate grout layer could cover only a part of the recess, in particular a part of a curved part of the recess (surface). However, it is typically more preferred for the aforementioned reasons that the substantially complete curved recess surface is formed by the separate grout covering layer, and more preferred that the substantially complete recess surface is formed by the separate grout covering layer. Optionally, the separate grout covering layer is omitted. In this latter case the upwardly facing recess surface is typically formed by either at least a part of the top section and/or by the core layer.

The separate grout layer is typically at least partially made of at least one material chosen from the group consisting of:
- a metal, such as aluminium, which could be applied as metal layer and/or as metallic particles,
- at least one thermoplastic material, like polyvinyl chloride (PVC), polyethylene terephthalate (PET), polyester or polyethylene (PE), and/or
- at least one thermoset material, such as polyurethane,
- at least one at least partially cured resin, in particular an at least partially cured ink and/or at least partially cured paint.

The separate grout layer could be a monolithic layer (single layer) or could consist of a laminate of a plurality of sublayers.

Preferably, the separate grout covering layer is formed by a coating. Typically, the coating is applied in liquid state by a roller or brush, wherein the paint is cured (dried) afterwards, typically by means of air and/or radiation, such as infrared radiation.

It is also imaginable and possibly also preferable, that the grout layer is provided by means of a transfer printing technique by means of a transfer film. Preferably, this transfer film (transfer foil) is initially provided with a transferable digital print. This digital print is transferred into and onto the recess during transfer printing, and will form at least a part of the recess surface. Forming the separate grout layer by a transferred print can be realized in a rather economic manner even with small production quantities.

It is also thinkable that the separate grout covering layer is formed by printed layer, in particular a digitally printed layer. In this manner a two-dimensional or even three-dimensional structure can be printed to form at least a part of the recess surface, and optionally also to provide the recess its shape, its texture, and/or its thickness. By means of digital printing an elevated (3D) structure can be created, also referred to as positive embossing. It is also imaginable that an etching liquid is printed onto an already printed liquid base layer which results in position selected indentations, also referred to as negative embossing. A combination of this positive embossing step and (preferably successive) negative embossing step is also imaginable in order to form the peripheral portion(s) of the covering structure. This printing process could thus be considered as a printing process where an embossed structure is created which eventually forms the recess.

The separate grout covering layer preferably has a substantially constant thickness. However, it is also imaginable that the separate grout covering layer has a varying thickness across the width direction of the recess. In this latter case, the grout covering layer is (more predominantly) responsible for providing the final shape of the recess as such, as well as of the upwardly facing recess surface.

Typically, the separate grout covering layer is connecting to the top surface of the tile panel. Typically, the separate grout covering layer is connecting to the side edge of the tile panel. The separate grout covering may have a smooth upper surface, which typically improves the cleanability of the grout. It is also imaginable that the separate grout covering layer has a (fine or coarse) textured upper surface. This textured surface provides the imitation grout line a more realistic look and feel compared to traditional filled grout lines.

The separate grout covering layer is typically glued and/or fused to an underlying part of the tile panel.

It is imaginable that wherein at least a part, for example one layer, of the top section extends to a side edge where a channel-shaped recess is formed. This results in the situation that the separate grout layer is applied onto the top section (part) situated in or underneath the recess. Although the complete top section could extend to the side edge, it is often preferred that the top section terminates at a distance from the side edge or that only a part of the top section, having a reduced thickness compared to the thickness of the top section, extends to the side edge. In this latter embodiment, typically one or two layers of the top section, such as a polymer layer (PVC layer) and optionally a decorative layer, extend(s) to the side edge. A typical wear layer of the top section of kept at a distance from said side edge. This provides space to efficiently create the recess. In case the entire top section terminates at a distance from the side edge, then it is typically preferred that the separate grout layer is directly applied onto an underlying core part (which connects to the side edge).

Preferably, the upwardly facing recess surface is at least partially gradually concavely curved across the width direction of the recess. This means that the curvature is a continuous curvature. This prevents the presence of sharp ridges (discontinuities) on the surface recess, which improves the appearance of the curved recess surface. Preferably, the upwardly facing recess surface is substantially completely concavely curved across the width direction of the recess.

The deepest point of at least one recess, defining the maximum depth of the recess (with respect to the (highest) top surface of the top section), could be situated at the side edge or at a distance from the side edge. In this latter case a more or less parabolically shaped recess surface is present. It is imaginable that at least one recess has a deepest point at a distance from the respect side edge, wherein said deepest point is located closer to the side edge than to the top surface of the tile panel.

The curvature of at least one concavely shaped part of the recess surface may have a constant radius. It is however also conceivable that the curvature of at least one concavely shaped part of the recess surface may have a radius which varies across the width direction. Preferably, the radius of at least one concavely shaped part of the recess surface increases in the direction towards the side edge. This results in the situation that the recess surface has the greatest curvature adjacent to the top surface of the top section and obtains less curvature in the direction towards the side edge. Here, it is e.g. imaginable that a recess surface part connecting to the side edge has a low or no curvature, which results in a substantially flat recess surface part at the side edge. Preferably, (at least a part of) at least one concavely shaped part of the recess surface has at least one radius of 3-7 millimetre, preferably 4-5 millimetre. Preferably, at least one concavely shaped part of the recess surface has a radius (in millimetres) exceeding the width (in millimetres) of the recess. Preferably, the width of the recess is smaller than 4.5 millimetre. Preferably, the a channel-shaped recess has a substantially constant width (across its length direction) which is delimited by the respective side edge of the tile panel. It is imaginable that the width of the recess (slightly) varies in its length direction to provide the recess a more natural appearance, which is for example attractive in case the decorative top section would have the look of a e.g. a wood pattern and/or a stone pattern.

The recess is provided with a chamfered edge (inclined edge) positioned in between the top surface of the top section and a concavely curved part of the recess surface. This is also called a (micro) bevel. This chamfered edge is typically flat and thus uncurved. The chamfer edge preferably encloses an angle with a plane defined by the tile panel which is situated in between 5 and 50 degrees, preferably in between 5 and 45 degrees. Typically, these (micro) bevel(s) are applied in order to create a smooth transition between the top surface and the curved part of the recess, and often also to compensate small height differences between the panels and to prevent the presence of unwanted sharp edges as much as possible, in order to improve look and feel of a tile panel covering consisting of a plurality of tile panels according to the invention. The width of this chamfered edge is typically situated in between 0.05 and 2 mm, and is preferably approximately 1 mm.

It is imaginable that at least one side edge is free of a channel-shaped recess. This recess-free side edge may be provided with a chamfered edge connecting to the top surface. In case a recessed side edge of a first tile panel is positioned against a recess-free side edge of a second tile panel, a (micro) bevelled curved grout line is created with an eccentrically positioned seam, which is less visible to the human eye and therefore attractive from an aesthetic point of view. In this manner, the imitation grout line appears as an uninterrupted body to the human eye.

Preferably, the tile panel is provided with at least two imitation grout lines along at least two connecting side edge of the tile panel, wherein each grout line is formed by a channel-shaped recess connecting to the top surface of the tile panel, which recess extends along a side edge of the tile panel, and has a substantially constant width which is delimited by the respective side edge of the tile panel, wherein the recess has an upwardly facing recess surface, which is at least partially formed by a separate grout covering layer, wherein said recess surface is at least partially concavely curved across the width direction of the recess. The shape and/or dimensioning of connecting grout lines may be identical or may be distinctive.

Preferably, said grout covering layer comprises a wear sublayer and a decorative sublayer, wherein said wear layer is connecting to the said top surface of the tile panel and comprising a substantially transparent material, such that said decorative sublayer is visually observable through said wear layer. The decorative (sub) layer may be formed by a digitally printed decorative layer. This decorative layer may be printed, either directly or indirectly (e.g. by using an intermediate primer layer), to the core layer. The decorative layer may also be formed by a film or foil bearing a decorative pattern. The decorative print or pattern may be of various nature and may e.g. be formed by imitation marble, imitation stone, imitation stone, imitation ceramic, or imitation wood, or may be any other possibly fantasy based pattern or design. Typically, the top section also comprises at least one intermediate layer, such as a polymer layer (e.g. a PVC layer) and/or a reinforcing layer, such as a glass fibre layer (woven or non-woven).

Preferably, said top section comprises a wear layer and a decorative layer, wherein said wear is made of substantially transparent material, such that said decorative layer is visually observable through said wear layer. It is also imaginable that the top section comprises or is entirely formed by at least one tile. This tile may be made of sliceable natural stone, marble, concrete, limestone, granite, slate, glass, ceramics, wood, or a composite material. Particular preferred are ceramic materials of a type selected from the group consisting of Monocuttura ceramic, Monoporosa ceramic, porcelain ceramic, or multi-casted ceramic.

In a preferred embodiment, the tile panel according to the invention is substantially made from one or more plastic composites, such as wood plastic composite and/or stone plastic composite. These materials have proven a highly suitable and feasible alternative to a traditional tile material such as marble, stone, ceramic or wood.

Preferably in the tile panel according to the invention, the recess surface has an upper texture which resembles the upper texture of a natural grout line, preferably having a coarse (rough) upper texture. The texture of the recess surface may be a roughened texture. This roughened texture may for instance be created by means of a roughening technique, for example mechanically brushing, which is performed after or during the formation of the recess itself. A rough upper texture of the recess surface effectively achieves that the imitation grout line appears to the human eye as if it were a natural grout line.

The separate grout covering layer may be made from a material that has wear resistant and/or water repellent properties which further improve the durability of the imitation grout line. The coating layer is for instance a thin film which is applied on the structure by transfer printing. The grout covering layer typically has a thickness of 0.010 mm up to 0.10 mm, but deviations from this range are also possible. By choosing an appropriate colour of the coating layer, the imitation grout line appears to the human eye as if it were a natural grout line.

The core layer may be rigid, flexible, or semi-rigid. The core layer may be solid or at least partially foamed. The core may comprise at least one virgin and/or recycled polymer selected from the group consisting of: ethylene vinyl acetate (EVA), polyurethane (PU), polyethylene (PE), polypropylene (PP), polystyrene (PS), polyvinylchloride (PVC), polyethylene terephthalate (PET), Polyisocyanurate (PIR), or mixtures thereof. The core layer may comprise at least one wood-based material. The core may comprise at least one composite material of at least one polymeric material and at least one non-polymeric material. The at least one non-polymeric material is preferably selected from the group consisting of: talc, chalk, wood, calcium carbonate, and a mineral filler. The core may comprise magnesium oxide and/or magnesium hydroxide. The upper side of the core is preferably substantially flat.

The tile panel according to the invention, has a preferred thickness in the range from 4.0 mm up to 12.0 mm. When the tile panel comprises a core layer and a top section, the top section may have a thickness in the range of 0.30 up to 1.20 mm, while the core layer may have a thickness in the range of 3.50 mm up to 11.0 mm. In case the top section is formed by one or more tiles, the overall thickness of the top section and of the tile panel as such will typically be larger.

Preferably, the maximum depth of the recess is in 0.2-1.5 millimetre, and more preferably the maximum depth of the recess is preferably 0.2-0.8 millimetre. In order to acquire a satisfactory visual effect of the imitation grout, the maximum vertical depth is chosen from this range. It is noted that in a tile panel which comprises both a top section and a core layer, the recessed curved grout line may be extending vertically into both the top section and the core layer.

In the tile panel according to the invention, the gradual curve of the recess surface preferably includes at least a tangent line under an angle of 45 degrees to a vertical vector of the tile panel, and further preferably also a tangent line under an angle of 20 degrees and 70 degrees to the vertical vector, and most preferably also a tangent line under an angle of 90 degrees to the vertical vector. The vertical vector of the tile panel is herein defined as a vector perpendicular to the top surface of the tile panel. The gradual curve that includes the above featured tangent lines, could be characterized as a part of a crescent shaped curve.

It is preferred in the tile panel according to the invention, that the side edges comprise at least one pair, preferably two pairs, of opposed side edges, wherein one side edge of said pair is provided with an imitation grout line while the other side edge of said pair is not provided with an imitation grout line. More preferably, the side edges comprise at least one pair, and preferably two pairs, of opposed side edges, wherein a first side edge of a pair is provided with an imitation grout line while the second side edge of the pair is not provided with an imitation grout line. When constructing a surface covering composed of neighbouring tile panels, the tile panels may be laid in a pattern wherein a first side edge of one tile panel abuts to a second side edge of another tile panel. In this situation, the imitation grout line between the two abutting tile panels is formed by the first side edge which contains the imitation grout line, while the second edge merely delimits the imitation grout line of the first side edge. When provided with two pairs of opposed side edges, it is possible to obtain a surface covering wherein each tile panel is visually bordered by two pairs of imitation grout lines. It is especially preferred that in the tile panel according to the invention, the first and second side edges of a pair are parallel to each other, preferably the tile panel having a rectangular or hexagonal format.

With regard to a pair of first and second side edges of a tile panel according to the invention, it is preferred that these are provided with mutually interacting coupling profiles, so that the first side edge of a first tile panel can be coupled to the second side edge of a second panel by a first, respectively second, coupling profile.

In a preferred embodiment of the tile panel according to the invention, at least one pair of opposing first and second side edges is provided with mutually interacting coupling profiles, so that the first side edge of a first tile panel can be coupled to the second side edge of a second tile panel, wherein the first side edge is provided with an imitation grout line, wherein an outer portion of said imitation grout line defines a vertical plane, wherein at least a part of a first coupling profile arranged at said first side edge extends with respect to said vertical plane over a horizontal distance which is larger than the width of the imitation grout line, and which is smaller than three times, preferably smaller than two times, the width of the imitation grout line. Preferably, a first tile panel edge comprises a first coupling profile, and a second tile panel edge, preferably opposite to the first tile panel edge, comprising a second coupling profile being designed to engage interlockingly with said first coupling profile of an adjacent panel, both in horizontal direction and in vertical direction, wherein the first coupling profile and the second coupling profile are preferably configured such that two of such panels can be coupled to each other by means of a lowering (drop-down or vertically downward) movement. Preferably, the first coupling profile comprises:

an upward tongue,
at least one upward flank lying at a distance from the upward tongue,
an upward groove formed in between the upward tongue and the upward flank wherein the upward groove is adapted to receive at least a part of a downward tongue of a second coupling profile of an adjacent panel, and
at least one first locking element, preferably provided at a distant side of the upward tongue facing away from the upward flank, and wherein the second coupling profile comprises:
a first downward tongue,
at least one first downward flank lying at a distance from the downward tongue, a first downward groove formed in between the downward tongue and the downward flank, wherein the downward groove is adapted to receive at least a part of an upward tongue of a first coupling profile of an adjacent panel, and at least one second locking element adapted for co-action with a first locking element of an adjacent panel, said second locking element preferably being provided at the downward flank.

Preferably, the tile panel comprises at least one third coupling profile and at least one fourth coupling profile located respectively at a third tile panel edge and a fourth tile panel edge, wherein the third coupling profile comprises:

a sideward tongue extending in a direction substantially parallel to the upper side of the core, at least one second downward flank lying at a distance from the sideward tongue, and a second downward groove formed between the sideward tongue and the second downward flank, wherein the fourth coupling profile comprises:

a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

Preferably, the first tile panel edge and the fourth tile panel edge are provided with an imitation grout line while the second tile panel edge and the third tile panel edge are not provided with an imitation grout line.

In a preferred embodiment of the tile panel according to the invention, fourth side edge is provided with an imitation grout line, wherein an outer portion of said imitation grout line defines a vertical plane, wherein at least a part of a fourth coupling profile arranged at said first side edge extends with respect to said vertical plane over a horizontal distance which is larger than the width of the imitation grout line, and which is smaller than three times, preferably smaller than two times, the width of the imitation grout line.

Preferably, an outer portion of the recess, connecting to a side edge of the panel, is configured to abut an outer portion of a recess of a similar tile panel, and defines a joint plane extending in the vertical plane. This means that the top sections of adjacent tile panels do not cut across this joint plane, and that the tile panels are free of any overlapping edge portions near the top surface of the tile panels.

Preferably, the recess surface is free of any convexly curved portions. Preferably the recess surface is entirely concavely curved.

In a (more) preferred embodiment, a first panel edge comprises a first coupling profile, and a second panel edge, preferably opposite to the first panel edge, comprising a second coupling profile being designed to engage interlockingly with said first coupling profile of an adjacent surface covering element, both in horizontal direction and in vertical direction, wherein the first coupling profile and the second coupling profile are preferably configured such that two of such surface covering elements can be coupled to each other by means of a lowering movement (fold-down movement). In case the surface covering element is rectangular, then the first panel edge and second panel edge are typically situated at opposite short edges of the surface covering element. The surface covering element preferably also comprises at least one third coupling profile and at least one fourth coupling profile located respectively at a third panel edge and a fourth panel edge, wherein the third coupling profile comprises: a sideward tongue extending in a direction substantially parallel to the upper side of the core, at least one second downward flank lying at a distance from the sideward tongue, and a second downward groove formed between the sideward tongue and the second downward flank, wherein the fourth coupling profile comprises: a third groove configured for accommodating at least a part of the sideward tongue of the third coupling profile of an adjacent surface covering element, said third groove being defined by an upper lip and a lower lip, wherein said lower lip is provided with an upward locking element, wherein the third coupling profile and the fourth coupling profile are configured such that two of such surface covering elements can be coupled to each other by means of a turning movement (angling down movement), wherein, in coupled condition: at least a part of the sideward tongue of a first surface covering element is inserted into the third groove of an adjacent, second surface covering element, and wherein at least a part of the upward locking element of said second surface covering element is inserted into the second downward groove of said first surface covering element. Preferably, complementary coupling profiles are configured to mutually lock coupled tile panels in a direction parallel to a plane defined by the tile panels, and/or in a direction perpendicular to said plane defined by the tile panels.

The top section and the core layer of the tile panel may be integrated with each other, which may lead to a monolithic (single layer) tile panel, wherein merely one or more separate grout covering layers are applied as additional layers to complete the tile panel.

According to a second aspect of the invention, a surface covering, such as a floor covering, wall covering or ceiling covering, is provided, which is constructed by a multitude of, preferably interconnected, neighbouring tile panels according to one of the preceding claims. Such a surface covering from a tile panels achieves a visually satisfactory result, wherein the surface covering appears to the human eye as a traditionally laid tile covering.

Preferred embodiments of the tile panel according to the invention are presented in the non-limitative set of clauses presented below:

1. Decorative tile panel suitable for covering a floor, ceiling or wall surface, which tile panel comprises:

at least one core layer, and at least one decorative top section, directly or indirectly affixed to said core layer, wherein the top section defines a top surface of the tile panel, a plurality of side edges at least partially defined by said core layer and/or by said top section, wherein the tile panel is provided with at least one imitation grout line along at least one side edge of the tile panel, which is formed by a channel-shaped recess connecting to the top surface of the tile panel, which recess extends along a side edge of the tile panel, and, preferably, has a substantially constant width which is delimited by the respective side edge of the tile panel, wherein the recess has an upwardly facing recess surface, which is at least partially formed by a separate grout covering layer, wherein said recess surface is at least partially concavely curved across the width direction of the recess.

2. Tile panel according to clause 1, wherein the substantially complete recess surface is formed by the separate grout covering layer.

3. Tile panel according to clause 1 or 2, wherein the separate grout covering layer is formed by a coating.

4. Tile panel according to one of the foregoing clauses, wherein the separate grout covering layer is formed by a transferred layer originating from a transfer foil or transfer film by means of transfer printing.

5. Tile panel according to one of the foregoing clauses, wherein the separate grout covering layer is formed by printed layer.

6. Tile panel according to one of the foregoing clauses, wherein the separate grout covering layer has a substantially constant thickness.

7. Tile panel according to one of the foregoing clauses, wherein the separate grout covering layer has a varying thickness across the width direction of the recess.

8. Tile panel according to one of the foregoing clauses, wherein the separate grout covering layer is connecting to the top surface of the tile panel.

9. Tile panel according to one of the foregoing clauses, wherein the separate grout covering layer is connecting to the respective side edge of the tile panel.

10. Tile panel according to one of the foregoing clauses, wherein the separate grout covering layer and the top surface of the tile panel have different visual appearances.

11. Tile panel according to one of the foregoing clauses, wherein the separate grout covering layer is darker than the top surface of the tile panel.

12. Tile panel according to one of the foregoing clauses, wherein the separate grout covering has a smooth upper surface.

13. Tile panel according to one of the foregoing clauses, wherein the separate grout covering layer has a textured upper surface.

14. Tile panel according to one of the foregoing clauses, wherein the separate grout covering layer is glued and/or fused to an underlying part of the tile panel.

15. Tile panel according to one of the foregoing clauses, wherein at least a part of the top section extends to a side edge where a channel-shaped recess is formed.

16. Tile panel according to one of the foregoing clauses, wherein the upwardly facing recess surface is at least partially gradually concavely curved across the width direction of the recess.

17. Tile panel according to one of the foregoing clauses, wherein the upwardly facing recess surface is substantially completely concavely curved across the width direction of the recess.

18. Tile panel according one of the foregoing clauses, wherein at least one recess has a deepest point at a distance from the respective side edge.

19. Tile panel according one of the foregoing clauses, wherein at least one recess has a deepest point at a distance from the respective side edge, wherein said deepest point is located closer to the side edge than to the top surface of the tile panel.

20. Tile panel according one of the foregoing clauses, at least one concavely shaped part of the recess surface has an increasing radius towards the respective side edge.

21. Tile panel according one of the foregoing clauses, wherein at least one concavely shaped part of the recess surface has a constant radius.

22. Tile panel according one of the foregoing clauses, wherein at least one concavely shaped part of the recess surface has at least one radius of 3-7 millimetre, preferably 4-5 millimetre.

23. Tile panel according one of the foregoing clauses, wherein at least one concavely shaped part of the recess surface has a radius exceeding the width of the recess.

24. Tile panel according one of the foregoing clauses, wherein the width of the recess is smaller than 4.5 millimetre.

25. Tile panel according one of the foregoing clauses, wherein the maximum depth of the recess is 0.2-1.5 millimetre, preferably 0.2-0.8 millimetre.

26. Tile panel according to one of the foregoing clauses, wherein the recess is provided with a chamfered edge positioned in between the top surface of the tile panel and a concavely curved part of the recess surface.

27. Tile panel according to one of the foregoing clauses, wherein at least one edge is free of a channel-shaped recess, wherein said edge is provided with a chamfered edge connecting to the top surface.

28. Tile panel according to one of the foregoing clauses, wherein the tile panel is provided with at least two imitation grout lines along at least two connecting side edge of the tile panel, wherein each grout line is formed by a channel-shaped recess connecting to the top surface of the tile panel, which recess extends along a side edge of the tile panel, and has a substantially constant width which is delimited by the respective side edge of the tile panel, wherein the recess has an upwardly facing recess surface, which is at least partially formed by a separate grout covering layer, wherein said recess surface is at least partially concavely curved across the width direction of the recess.

29. Tile panel according to the one of the foregoing clauses, wherein said grout covering layer comprises a wear sublayer and a decorative sublayer, wherein said wear layer is connecting to the said top surface of the tile panel and comprising a substantially transparent material, such that said decorative sublayer is visually observable through said wear layer.

30. Tile panel according to the one of the foregoing clauses, wherein said top section comprises a wear layer and a decorative layer, wherein said wear layer is coincident with said top surface of the tile panel and comprising a substantially transparent material, such that said decorative layer is visually observable through said wear layer.

31. Tile panel according to according to one of the foregoing clauses, wherein the core layer of the tile panel is at least partially made from one or more plastic composites, such as wood plastic composite and/or stone plastic composite and/or mineral plastic composite.

32. Tile panel according to one of the foregoing clauses, wherein the tile panel has a thickness in the range from 4.0 mm up to 12.0 mm.

33. Tile panel according to one of the foregoing clauses, wherein the gradual curve of the recess surface includes at least a tangent line under an angle of 45 degrees to a vertical vector of the tile panel, and preferably also a tangent line under an angle of 20 degrees and 70 degrees to the vertical vector, and most preferably also a tangent line under an angle of 90 degrees to the vertical vector.

34. Tile panel according to one of the foregoing clauses, wherein the side edges comprise at least one pair, preferably two pairs, of opposed side edges, wherein a first side edge of a pair is provided with an imitation grout line while the second side edge of the pair is not provided with an imitation grout line.

35. Tile panel according to clause 34, wherein the first and second side edges of a pair are parallel to each other, preferably the tile panel having a rectangular or hexagonal format.

36. Tile panel according to clause 34 or 35, wherein the first and/or second side edges of a pair are provided with mutually interacting coupling profiles, so that the first side edge of a first tile panel can be coupled to the second side edge of a second panel.

37. Tile panel according to clause 36, wherein the coupling profiles are configured to mutually lock coupled tile panels in a direction parallel to a plane defined by the tile panels, and/or in a direction perpendicular to said plane defined by the tile panels.

38. Tile panel according to one of the foregoing claims, wherein said recess has a deepest point at a distance from the respective side edge, wherein said deepest point is located closer to said side edge than to the top surface of the tile panel, and wherein the width of said recess is at least three times the maximum depth of said recess with respect to the top surface of the tile panel.

39. Tile panel according to clause 38, wherein the width of said recess is at least six times the maximum depth of said recess with respect to the top surface of the tile panel.

40. Tile panel according to clause 38 or 39, wherein the deepest point of said recess divides the recess into an inner recess portion, connecting to the top surface of the tile panel, and an outer recess portion, connecting to the side edge of the tile panel, wherein the width of the inner recess portion is at least two times the width of the outer recess portion.

41. Tile panel according to clause 40, wherein the width of the inner recess portion is at least three times the width of the outer recess portion.

42. Tile panel according to clause 40 or 41, wherein the maximum height of the inner recess portion with respect to the deepest point is at least four times the maximum height of the outer recess portion with respect to the deepest point.

42. Tile panel according to one of the foregoing clauses, wherein at least one concavely shaped part of the recess surface has an increasing radius towards the side edge.

43. Tile panel according to one clauses 40-42, wherein the recess surface of the inner recess portion has an increasing radius towards the deepest point.

44. Tile panel according to one of the foregoing clauses, wherein the thickness of the tile panel is at least ten times the maximum depth of the recess with respect to the top surface of the tile panel.

45. Tile panel according to one of the foregoing clauses, wherein the side edges comprise at least one pair, preferably two pairs, of opposed side edges, wherein one side edge of said pair is provided with an imitation grout line while the other side edge of said pair is not provided with an imitation grout line.

46. Tile panel according to one of the foregoing clauses, wherein at least one pair of opposing first and second side edges is provided with mutually interacting coupling profiles, so that the first side edge of a first tile panel can be coupled to the second side edge of a second tile panel, wherein the first side edge is provided with an imitation grout line, wherein an outer portion of said imitation grout line defines a vertical plane, wherein at least a part of a first coupling profile arranged at said first side edge extends with respect to said vertical plane over a horizontal distance which is larger than the width of the imitation grout line, and which is smaller than three times, preferably smaller than two times, the width of the imitation grout line.

47. Tile panel according to one of the foregoing clauses, wherein a first tile panel edge comprises a first coupling profile, and a second tile panel edge, preferably opposite to the first tile panel edge, comprising a second coupling profile being designed to engage interlockingly with said first coupling profile of an adjacent panel, both in horizontal direction and in vertical direction, wherein the first coupling profile and the second coupling profile are preferably configured such that two of such panels can be coupled to each other by means of a lowering movement.

48. Tile panel according to clause 47, wherein the first coupling profile comprises:
   an upward tongue,
   at least one upward flank lying at a distance from the upward tongue,
   an upward groove formed in between the upward tongue and the upward flank wherein the upward groove is adapted to receive at least a part of a downward tongue of a second coupling profile of an adjacent panel, and
   at least one first locking element, preferably provided at a distant side of the upward tongue facing away from the upward flank, and wherein the second coupling profile comprises:
   a first downward tongue,
   at least one first downward flank lying at a distance from the downward tongue,
   a first downward groove formed in between the downward tongue and the downward flank, wherein the downward groove is adapted to receive at least a part of an upward tongue of a first coupling profile of an adjacent panel, and
   at least one second locking element adapted for co-action with a first locking element of an adjacent panel, said second locking element preferably being provided at the downward flank.

49. Tile panel according to one of the foregoing clauses, wherein the tile panel comprises at least one third coupling profile and at least one fourth coupling profile located respectively at a third tile panel edge and a fourth tile panel edge, wherein the third coupling profile comprises:
   a sideward tongue extending in a direction substantially parallel to the upper side of the core,
   at least one second downward flank lying at a distance from the sideward tongue, and
   a second downward groove formed between the sideward tongue and the second downward flank,
wherein the fourth coupling profile comprises:
   a third groove configured for accommodating at least a part of the sideward tongue of the third coupling profile of an adjacent panel, said third groove being defined by an upper lip and a lower lip, wherein said lower lip is provided with an upward locking element,
wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

50. Tile panel according to clauses 48 and 49, wherein the first tile panel edge and the fourth tile panel edge are provided with an imitation grout line while the second tile panel edge and the third tile panel edge are not provided with an imitation grout line.

51. Tile panel according to one of the foregoing clauses, wherein an outer portion of the recess, connecting to a side edge of the panel, is configured to abut an outer portion of a recess of a similar tile panel, and defines a joint plane extending in the vertical plane.

52. Tile panel according to one of the foregoing clauses, wherein the recess surface is free of any convexly curved portions, and wherein the recess surface is preferably entirely concavely curved.

53. Surface covering, in particular for a floor, ceiling or wall surface, which is constructed by a multitude of neighbouring tile panels according to one of the foregoing clauses.

54. Surface covering according to clause 53 which is constructed by a multitude of neighbouring interconnected tile panels according to one of the foregoing clauses.

BRIEF DESCRIPTION OF THE DRAWINGS

The invention will be further elucidated by several examples and with reference to the appended figures, wherein.

DESCRIPTION OF THE INVENTION

Figure 1:
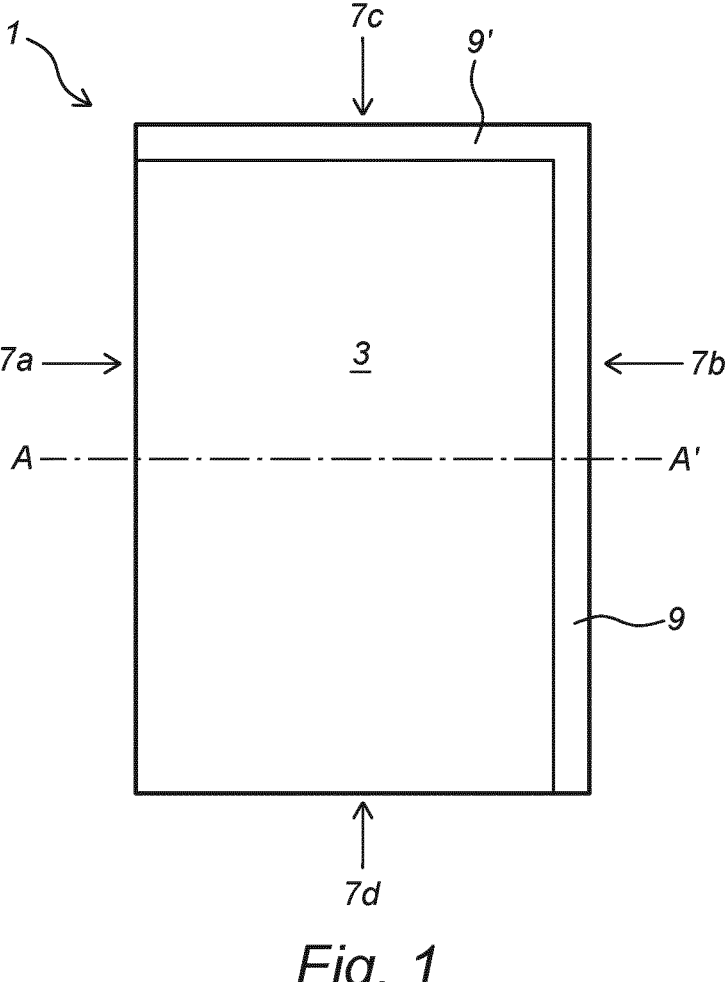
FIG. 1 is a top view of a tile panel according to a preferred embodiment of the invention.

FIG. 1 shows a tile panel 1 of a substantially flat format having a top surface 3, a bottom surface (not visible) and a plurality of side edges 7a-d.

The tile panel 1 is provided with two imitation grout lines 9 and 9', along the two side edges 7b and 7c, which is formed by a recess in the top surface 3 and has a substantially constant width which is delimited by the respective side edges 7b and 7c.

Figure 2:
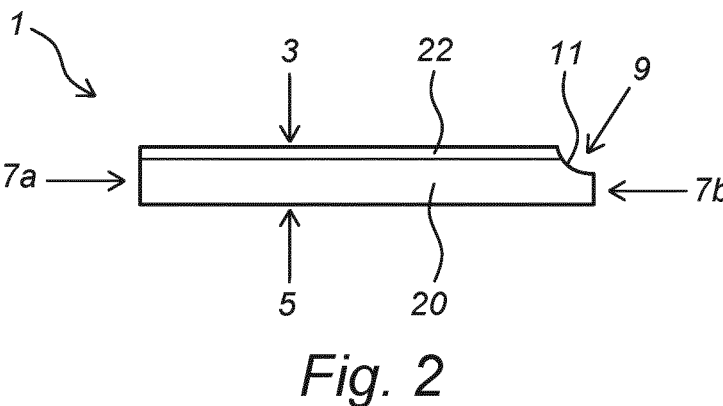
FIG. 2 is a cross-sectional view of the tile panel of FIG. 1.

Dotted line A-A' indicates a cross-section of the panel which is depicted in FIG. 2.

FIG. 2 shows a cross-section of the same tile panel 1 as in FIG. 1, along line A-A' in FIG. 1. Identical parts in both figures have the same reference numerals as in FIG. 1.

The tile panel has a bottom surface 5, and is composed of a substantially flat core layer 20 of a resilient material, and a substantially flat top layer 22 that is connected to the top side of the core layer 20. The top layer 22 has properties that resemble natural material such as marble, stone, ceramic or wood, and is made from a wood plastic composite and/or stone plastic composite. The core layer 20 is made of a thermoplastic, for instance PVC.

The imitation grout line 9 is formed by a recess having an upwards facing recess surface 11, which recess surface comprises a gradual curve of a concave type over the width direction of the recess 9.

Figure 3:
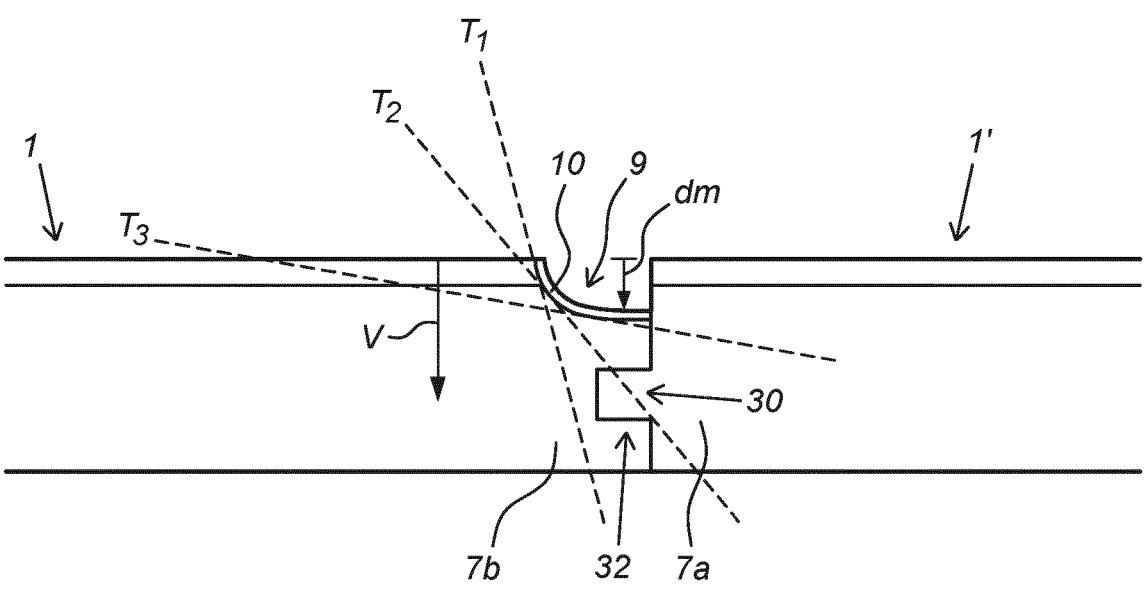
FIG. 3 is a cross-sectional view of another preferred embodiment of the tile panel according to the invention.

FIG. 3 shows two abutting side edges 7a and 7b of two neighbouring tile panels 1 and 1', which are interlinked by a coupling profile comprising a tongue 30 and groove 32 which are provided at the respective side edges 7a and 7b.

The imitation grout line 9 is formed by a crescent shaped recess which comprises a grout covering layer 10 the top side of which forms the upwards facing recess surface. The grout covering layer 10 has a rough upper texture and preferably a grey colour. The recess 9 has a maximum vertical depth as indicated by the arrow dm. The vertical vector V is perpendicular oriented to the top surface of the tile panel 1, and indicates the vertical direction of the tile panel.

The form of the gradual curve of the recess surface is characterized by tangent lines T1, T2, T3, wherein T1 has an angle of 15 degrees to vertical vector V, T2 an angle of 40 degrees to the vertical vector V, and T3 has an angle of 80 degrees to vertical vector V.

Figure 4:
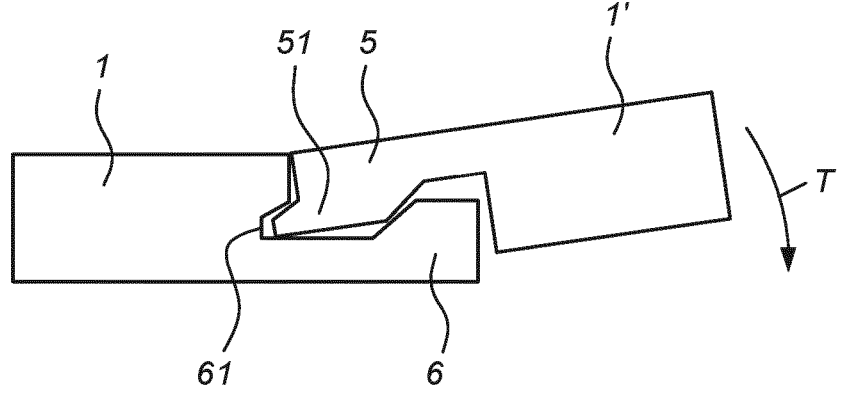
FIG. 4 is a cross-sectional view of a detail of the side edges of two neighbouring panels that are interlinked to each other by a preferred type of coupling profiles.

FIG. 4 shows two side edges of two neighbouring tile panels 1 and 1', which are interlinked by a coupling profile 5 and 6 which contain a tongue 51 and a groove 61. The coupling profiles 5 and 6 are configured such that an angling or turning movement (depicted by arrow T) allows for coupling the two profiles together, which results in an interlocked coupling in the horizontal plane.

Figure 5:
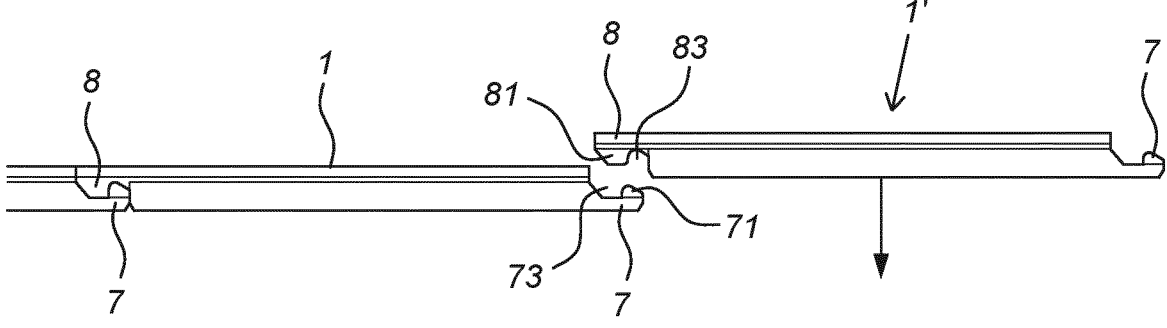
FIG. 5 is a cross-sectional view of two neighbouring panels that are interlinked to each other by another preferred type of coupling profiles.

FIG. 5 shows two side edges of two neighbouring tile panels 1 and 1', which are interlinked by a coupling profile 7 and 8 which contain a respective tongue 71 and groove 73, and a respective tongue 81 and groove 83. The coupling profiles 7 and 8 are configured such that a drop down movement of panel 1' (depicted by the arrow) allows for coupling of the two profiles together, which results in an interlocked coupling in the horizontal plane.

Figures 6, 7:
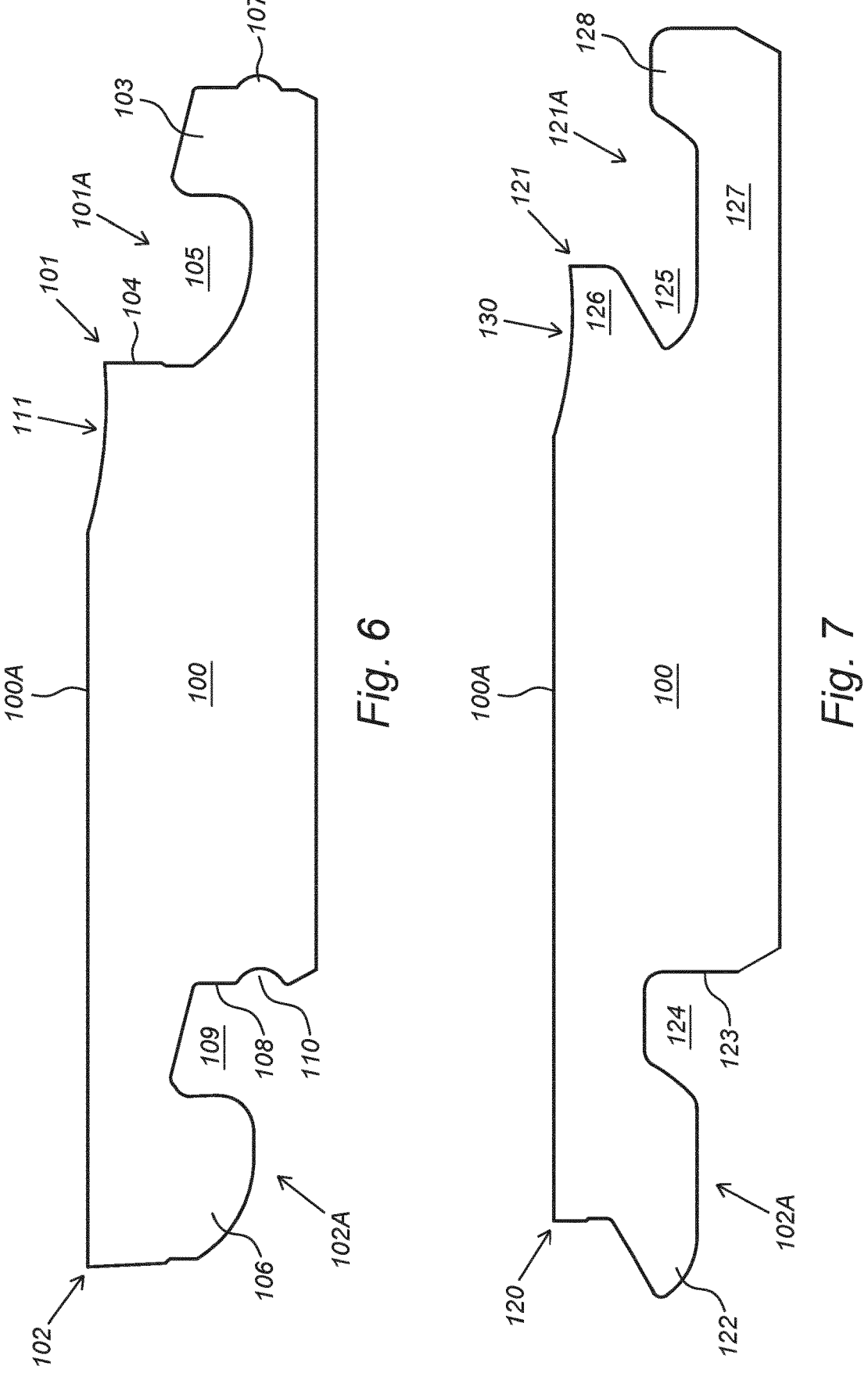
FIG. 6 is a longitudinal-sectional view of a tile panel according to the invention.
FIG. 7 is a cross-sectional view of the tile according to FIG. 6.
Figure 8:
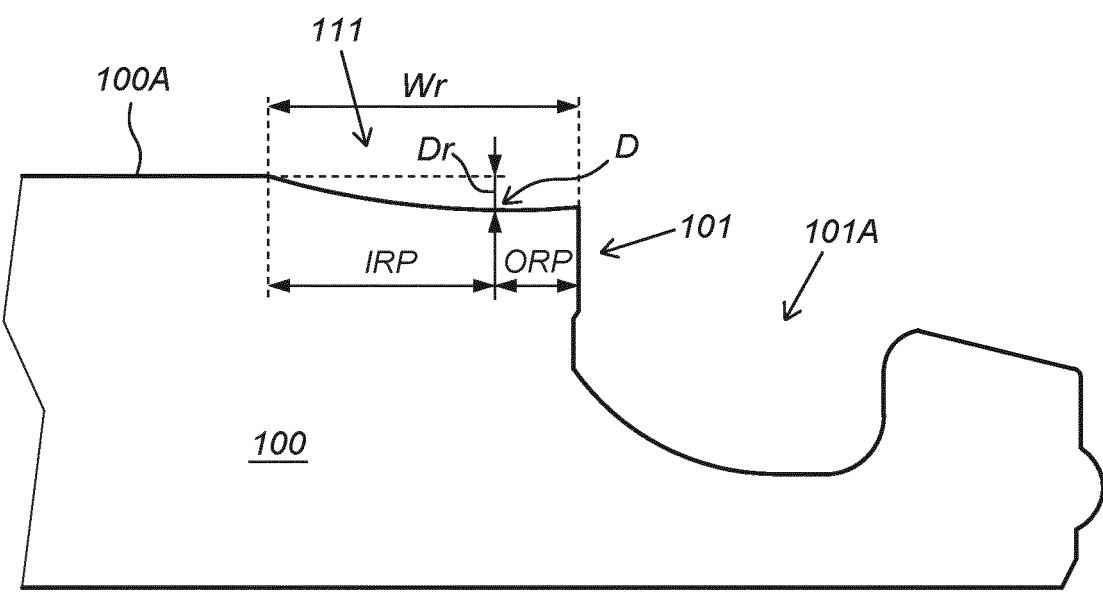
FIG. 8 is a detailed partial view of the longitudinal-section view according to FIG. 6.

FIG. 6 is a longitudinal-sectional view of a tile panel 100 according to the invention. The tile panel 100 comprises a first tile panel edge 101 comprises a first coupling profile 101a, and a second tile panel edge 102, preferably opposite to the first tile panel edge 101, comprising a second coupling profile 102a being designed to engage interlockingly with said first coupling profile 101a of an adjacent panel, both in horizontal direction and in vertical direction, wherein the first coupling profile 101a and the second coupling profile 102a are preferably configured such that two of such panels can be coupled to each other by means of a lowering movement. The first coupling profile 101a comprises: an upward tongue 103, at least one upward flank 104 lying at a distance from the upward tongue 103, an upward groove 105 formed in between the upward tongue 103 and the upward flank 104 wherein the upward groove 105 is adapted to receive at least a part of a downward tongue 106 of the second coupling profile 102a of an adjacent panel, and at least one first locking element 107, preferably provided at a distant side of the upward tongue 103 facing away from the upward flank 104, and wherein the second coupling profile 102a comprises: a first downward tongue 106, at least one first downward flank 108 lying at a distance from the downward tongue 106, a first downward groove 109 formed in between the downward tongue 106 and the downward flank 108, wherein the downward groove 109 is adapted to receive at least a part of an upward tongue 103 of a first coupling profile 101a of an adjacent panel, and at least one second locking element 110 adapted for co-action with a first locking element 107 of an adjacent panel, said second locking element 110 preferably being provided at the downward flank 108. The proximal sides of the tongues 103, 106, as seen in downward direction, are inclined towards the facing flanks 104, 108, which leads to an additional vertical locking effect in coupled condition of two tile panels 100. The first edge is provided with a concavely curved channel-like recess 111, which constitutes an imitation grout line, which is shown in more detail in FIG. 8.

The recess 111 has a deepest point D at a distance from the respective side edge 101, wherein said deepest point is located closer to said side edge 101 than to a top surface of the tile panel 100a. In this example, the width Wr of said recess 111 is at least eight times the maximum depth Dr of said recess with respect to the top surface of the tile panel. As seen in more detail in FIG. 8, the deepest point D of said recess divides the recess into an inner recess portion IRP, connecting to the top surface of the tile panel, and an outer recess portion ORP, connecting to the side edge 101 of the tile panel, wherein the width of the inner recess portion IRP is at least three times the width of the outer recess portion ORP. The maximum height of the inner recess portion IRP with respect to the deepest point is at least five times the maximum height of the outer recess portion ORP with respect to the deepest point. This leads to the embodiment, wherein the height of the outer recess portion is kept limited, which makes this outer recess portion less vulnerable for breakage. As shown, the recess surface of the inner recess portion IRP has an increasing radius towards the deepest point. This allows the formation of a clear transition line between the recess and the top surface of the tile panel, while keeping the depth of the recess as such limited.

In this example, the thickness of the tile panel is at least ten times the maximum depth of the recess with respect to the top surface of the tile panel.

Figure 9:
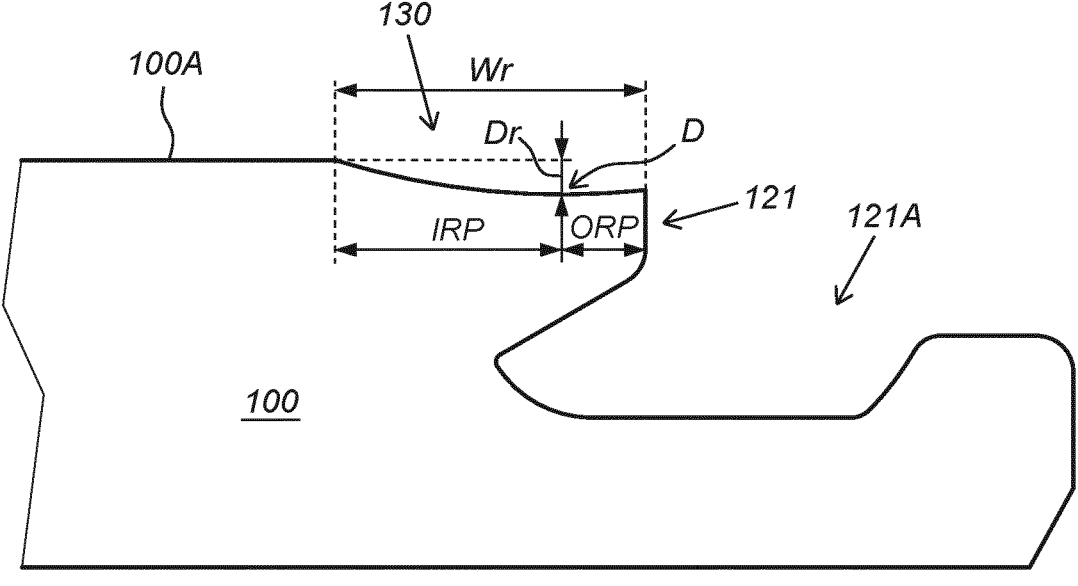
FIG. 9 is a detailed partial view of the cross-sectional view according to FIG. 7.

In the cross-sectional view shown in FIG. 7, it is shown that the tile panel 100 comprises at least one third coupling profile 120a and at least one fourth coupling profile 121a located respectively at a third tile panel edge 120 and a fourth tile panel edge 121, wherein the third coupling profile 120a comprises: a sideward tongue 122 extending in a direction substantially parallel to the upper side 100a of the tile panel 100, at least one second downward flank 123 lying at a distance from the sideward tongue 122, and a second downward groove 124 formed between the sideward tongue 122 and the second downward flank 123. The fourth coupling profile comprises a third groove 125 configured for accommodating at least a part of the sideward tongue 122 of the third coupling profile 120a of an adjacent tile panel, said third groove 125 being defined by an upper lip 126 and a lower lip 127, wherein said lower lip 127 is provided with an upward locking element 128, wherein the third coupling profile 120a and the fourth coupling profile 121a are configured such that two of such panels can be coupled to each other by means of a turning (angling in) movement, wherein, in coupled condition: at least a part of the sideward tongue 122 of a first tile panel 100 is inserted into the third groove 125 of an adjacent, second panel 100, and wherein at least a part of the upward locking element 128 of said second tile panel is inserted into the second downward groove 124 of said first tile panel 100. The fourth edge is provided with a concavely curved channel-like recess 130, which constitutes an imitation grout line, which is shown in more detail in FIG. 9, and which has exactly the same shape, features, and dimensions as the recess 111 shown in FIGS. 6 and 8. Hence, the first tile panel edge and the fourth tile panel edge are provided with an imitation grout line 111, 130 while the second tile panel edge and the third tile panel edge are free of any imitation grout line.

In FIGS. 6-9 the layers of the tile panel 100 are not explicitly shown, but typically such a tile panel comprises, at least one core layer, and at least one decorative top section, directly or indirectly affixed to said core layer, wherein the top section defines a top surface of the tile panel. The channel-like recesses 111, 130 are preferably provided with a decorative covering layer. The channel-like recesses 111, 130 may be entirely situated in the decorative top section, and thus above the core layer. However, it is also imaginable, and often preferable, that each of the channel-like recesses 111, 130 is partially situation in the top section and partially in the core layer. Optionally, other layers, such as a backing layer, covering a rear side of the core layer, may be applied.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re) combined in order to arrive at a specific application.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A tile panel for covering a floor, ceiling or wall surface, which tile panel comprises:

at least one core layer, at least one decorative top section, directly or indirectly affixed to said core layer, wherein the top section defines a top surface of the tile panel, a plurality of side edges at least partially defined by said core layer and/or by said top section, at least one imitation grout line, comprising a channel shaped recess and at least one separate grout covering layer, wherein the at least one imitation grout line is provided along at least one side edge of the tile panel, which is formed by the channel-shaped recess connecting to the top surface of the tile panel, which recess extends along a side edge of the tile panel, and has a substantially constant width which is delimited by the respective side edge of the tile panel, wherein the channel shaped recess has an upwardly facing recess surface, which is at least partially formed by the separate grout covering layer, wherein said recess surface is at least partially concavely curved across the width direction of the recess, wherein a first tile panel edge comprises a first coupling profile, and a second tile panel edge, opposite to the first tile panel edge, comprising a second coupling profile being designed to engage interlockingly with said first coupling profile of an adjacent panel, both in horizontal direction and in vertical direction, wherein the first coupling profile and the second coupling profile are configured such that two of such panels can be coupled to each other by means of a lowering movement, wherein the first coupling profile comprises:

an upward tongue, at least one upward flank lying at a distance from the upward tongue, an upward groove formed in between the upward tongue and the upward flank wherein the upward groove is adapted to receive at least a part of a downward tongue of a second coupling profile of an adjacent panel, and at least one first locking element provided at a distant side of the upward tongue facing away from the upward flank, extending horizontally from the at least one side edge and including a convexly curved radius, and wherein the second coupling profile comprises:

a first downward tongue, at least one first downward flank lying at a distance from the downward tongue, a first downward groove formed in between the downward tongue and the downward flank, wherein the downward groove is adapted to receive at least a part of an upward tongue of a first coupling profile of an adjacent panel, and at least one second locking element adapted for co-action with a first locking element of an adjacent panel, said second locking element being provided at the downward flank, extending horizontally into the downward flank and including a concavely curved radius.

2. The tile panel according to claim 1, wherein the tile panel comprises at least one third coupling profile and at least one fourth coupling profile located respectively at a third tile panel edge and a fourth tile panel edge, wherein the third coupling profile comprises:

a sideward tongue extending in a direction substantially parallel to the upper side of the core, at least one second downward flank lying at a distance from the sideward tongue, and a second downward groove formed between the sideward tongue and the second downward flank, wherein the fourth coupling profile comprises:

a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

3. The tile panel according to claim 2, wherein the first tile panel edge and the fourth tile panel edge are provided with an imitation grout line while the second tile panel edge and the third tile panel edge are not provided with an imitation grout line.

4. The tile panel according to claim 1, wherein an outer portion of the recess, connecting to a side edge of the panel, is configured to abut an outer portion of a recess of a similar tile panel, and defines a joint plane extending in the vertical plane.

5. The tile panel according to claim 1, wherein the recess surface is free of any convexly curved portions, and wherein the recess surface is entirely concavely curved.

6. The tile panel according to claim 1, wherein the recess surface is substantially formed by the separate grout covering layer.

7. The tile panel according to claim 1, wherein the separate grout covering layer is formed by a coating.

8. The tile panel according to claim 1, wherein the separate grout covering layer is formed by a transferred layer originating from a transfer foil or transfer film by means of transfer printing.

9. The tile panel according to claim 1, wherein the separate grout covering layer is formed by printed layer.

10. The tile panel according to claim 1, wherein said channel shaped recess has a deepest point at a distance from the respective side edge, wherein said deepest point is located closer to said side edge than to the top surface of the tile panel.

11. The tile panel according to claim 10, wherein the width of said channel shaped recess is at least three times the maximum depth of said channel shaped recess with respect to the top surface of the tile panel.

12. The tile panel according to claim 10, wherein the deepest point of said channel shaped recess divides the recess into an inner recess portion, connecting to the top surface of the tile panel, and an outer recess portion, connecting to the side edge of the tile panel, wherein the width of the inner recess portion is at least two times the width of the outer recess portion.

13. The tile panel according to claim 12, wherein the width of the inner recess portion is at least three times the width of the outer recess portion.

14. The tile panel according to claim 12, wherein the maximum height of the inner recess portion with respect to the deepest point is at least four times the maximum height of the outer recess portion with respect to the deepest point.

15. The tile panel according to claim 12, wherein at least one concavely shaped part of the recess surface has an increasing radius towards the side edge.

16. The tile panel according to claim 12, wherein the recess surface of the inner recess portion has an increasing radius towards the deepest point.

17. The tile panel according to claim 12, wherein the thickness of the tile panel is at least ten times the maximum depth of the recess with respect to the top surface of the tile panel.

18. The tile panel according to claim 12, wherein the side edges comprise at least one pair of opposed side edges, wherein one side edge of said pair is provided with an imitation grout line while the other side edge of said pair is not provided with an imitation grout line.

19. The tile panel according to claim 12, wherein at least one pair of opposing first and second side edges is provided with mutually interacting coupling profiles, so that the first side edge of a first tile panel can be coupled to the second side edge of a second tile panel, wherein the first side edge is provided with an imitation grout line, wherein an outer portion of said imitation grout line defines a vertical plane, wherein at least a part of a first coupling profile arranged at said first side edge extends with respect to said vertical plane over a horizontal distance which is larger than the width of the imitation grout line, and which is smaller than three times the width of the imitation grout line.

* * * * *